United States Patent
Goldstein et al.

(10) Patent No.: US 12,518,184 B2
(45) Date of Patent: *Jan. 6, 2026

(54) METHODS AND SYSTEMS FOR CUSTOMIZING RECOMMENDATIONS BASED ON USER ACTIONS

(71) Applicant: Capital One Services, LLC, McLean, VA (US)

(72) Inventors: Joseph Goldstein, Potomac, MD (US); Thomas Dodson, Forest Hills, NY (US); Eric Delgado, Brooklyn, NY (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/639,855

(22) Filed: Apr. 18, 2024

(65) Prior Publication Data

US 2024/0265282 A1 Aug. 8, 2024

Related U.S. Application Data

(63) Continuation of application No. 17/228,800, filed on Apr. 13, 2021, now Pat. No. 11,989,665, which is a continuation of application No. 16/654,235, filed on Oct. 16, 2019, now Pat. No. 11,004,004.

(51) Int. Cl.
*G06N 5/04* (2023.01)
*G06Q 40/02* (2023.01)

(52) U.S. Cl.
CPC ............... *G06N 5/04* (2013.01); *G06Q 40/02* (2013.01)

(58) Field of Classification Search
CPC ....................................................... G06Q 40/00
USPC ............................................................ 705/35
See application file for complete search history.

(56) References Cited

U.S. PATENT DOCUMENTS

| | | | | |
|---|---|---|---|---|
| 5,953,710 A * | 9/1999 | Fleming | ............... | G06Q 20/405 235/380 |
| 6,043,815 A * | 3/2000 | Simonoff | ............ | G06F 9/45512 715/744 |
| 6,993,510 B2 * | 1/2006 | Guy | ........................ | G06Q 20/04 705/72 |
| 7,086,586 B1 * | 8/2006 | Sullivan | ............. | G06Q 30/0277 235/382 |
| 7,400,883 B2 * | 7/2008 | Rivers | .................... | G06Q 40/00 705/68 |
| 7,413,113 B1 * | 8/2008 | Zhu | ......................... | G06Q 20/12 235/375 |
| 7,631,803 B2 * | 12/2009 | Peyret | .................... | G06Q 20/10 235/380 |

(Continued)

*Primary Examiner* — Kirsten S Apple
(74) *Attorney, Agent, or Firm* — Foley & Lardner LLP

(57) ABSTRACT

In an example embodiment, a system is described for customizing user accounts based on user actions, which may include receiving, via a user device, a first user input requesting to create an account for a user. The system may further receive, via the user device, a second user input selecting an account type for the account from a plurality of account types. In response to these user inputs, the system may retrieve, from a server, one or more account requirements for the account type, determine that the user meets the one or more account requirements and create an account in response to determining that the user meets the one or more account requirements.

20 Claims, 5 Drawing Sheets

(56) References Cited

U.S. PATENT DOCUMENTS

| | | | | |
|---|---|---|---|---|
| 7,757,944 B2* | 7/2010 | Cline | G06Q 20/10 | 705/16 |
| 7,860,790 B2* | 12/2010 | Monk | G06Q 40/03 | 705/35 |
| 7,925,285 B2* | 4/2011 | Indirabhai | H04W 56/00 | 375/354 |
| 2002/0062249 A1* | 5/2002 | Iannacci | G06Q 30/06 | 705/14.1 |
| 2002/0174016 A1* | 11/2002 | Cuervo | G07F 19/20 | 705/16 |
| 2003/0115550 A1* | 6/2003 | Womble | G09B 7/02 | 715/210 |
| 2003/0172039 A1* | 9/2003 | Guy | G06Q 20/403 | 705/68 |
| 2005/0021457 A1* | 1/2005 | Johnson | G06Q 20/04 | 705/39 |
| 2007/0152068 A1* | 7/2007 | Kurita | G07F 7/1008 | 235/492 |
| 2007/0162369 A1* | 7/2007 | Hardison | G06Q 40/04 | 705/35 |
| 2007/0174166 A1* | 7/2007 | Jones | G06Q 30/02 | 705/35 |
| 2007/0262140 A1* | 11/2007 | Long | G06Q 20/04 | 235/380 |
| 2008/0255980 A1* | 10/2008 | Kasower | G06Q 30/016 | 705/35 |
| 2009/0281941 A1* | 11/2009 | Worth | G06Q 20/04 | 705/39 |
| 2009/0281951 A1* | 11/2009 | Shakkarwar | G06Q 20/04 | 705/67 |
| 2010/0063906 A1* | 3/2010 | Nelsen | G06Q 20/363 | 705/30 |
| 2010/0076833 A1* | 3/2010 | Nelsen | G06Q 20/357 | 705/26.1 |
| 2010/0088188 A1* | 4/2010 | Kumar | G06Q 20/10 | 705/17 |
| 2013/0013513 A1* | 1/2013 | Ledbetter | G06Q 40/12 | 705/44 |
| 2019/0378207 A1* | 12/2019 | Dibner-Dunlap | H04L 67/535 | |

* cited by examiner

METHODS AND SYSTEMS FOR CUSTOMIZING RECOMMENDATIONS BASED ON USER ACTIONS

CROSS REFERENCE OF RELATED APPLICATIONS

This application is a continuation of U.S. patent application Ser. No. 17/228,800, filed Apr. 13, 2021, which is a continuation of U.S. patent application Ser. No. 16/654,235, filed on Oct. 16, 2019. The content of the aforementioned applications is incorporated herein by reference in its entirety.

FIELD OF THE DISCLOSURE

Aspects of the disclosure relate to customizing recommendations for a user account of a user based on the user's actions.

BACKGROUND

In recent years, data on the habits and preferences of users has grown. In some instances, this data may be used to provide recommendations for users on a general and individual level.

SUMMARY

Some of the example embodiments of methods, systems, or devices disclosed herein are for improved techniques for customizing recommendations based on user actions. For example, some of the methods, systems, and devices disclosed herein innovate by customizing the type of recommendation and the type of action that causes a particular recommendation to be selected. For example, some of the example methods, systems, and devices disclosed herein use a proactive approach to craft a customized user account in which any eventual recommendations to the user can be selected through an organic process.

In one aspect of an example embodiment, a system for customizing user accounts based on user actions may include receiving, via a user device, a first user input requesting to create an account for a user. The system may further receive, via the user device, a second user input selecting an account type for the account from a plurality of account types. In response to these user inputs, the system may retrieve, from a server, one or more account requirements for the account type, determine that the user meets the one or more account requirements and create an account in response to determining that the user meets the one or more account requirements. However, in contrast to traditional systems that use a reactive approach and tie generic recommendations to either specific types of accounts or accounts with a particular status, the system begins the process that leads to customized recommendation immediately by selecting the action types that are used to generate recommendations for the user account. By customizing the action types that may result in recommendations, the system improves the likelihood that the user with participate (and eventually complete) the given actions. Thus, the system uses a proactive approach that can begin to incentivize the user to tailor their behaviors prior to any recommendations being provided.

After creating the account, the system selects, based on the one or more account requirements, an action type from a plurality of action types for the account. By using the account requirements as the basis of the action type selection (as opposed to simply using an account type itself), the system can select a starting point for the tailoring of the account that is both more flexible and applicable to a wider spectrum of accounts (e.g., user accounts that include aggregations of other accounts). For example, traditional systems may tie recommendations to a given type of account in order to categorize user accounts and offer recommendations that are generally successful to those types of account holders. However, given the exponential growth in user data as well as the accessibility and usability of this data, categorizing users as such a high level is no longer necessary. Instead, the methods, systems, and devices disclosed herein use a more empirical approach in which the underlying account requirements are used as a starting point for customizing a user account. In another example, user accounts may become linked and/or intertwined with each other. By relying on the underlying account requirements for these accounts, as opposed to a particular type of account, the methods, systems, and devices disclosed herein are applicable to these linked and/or intertwined accounts.

The system then determines whether or not the user completed an action of the action type. In response to determining that the user did complete the action of the action type, the system generates for display, on a user interface for the user device, a recommendation for the account based on completion of the action of the action type. Furthermore, as the user account has been able to proactively incentivize users into particular behaviors through the selection of action types, recommendation types, etc., the recommendations provided to the user can be structured as rewards for completing the action (as opposed to recommendations to complete additional actions). By structuring the recommendations in a positive light, users are more likely to accept the recommendations.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details of some examples are set forth in order to provide a thorough understanding. It will be appreciated, however, by those having skill in the art that the embodiments may be practiced without these specific details or with an equivalent arrangement. In other cases, well-known structures and devices are shown in block diagram form in order to avoid unnecessarily obscuring the embodiments of the invention.

Figure 1:
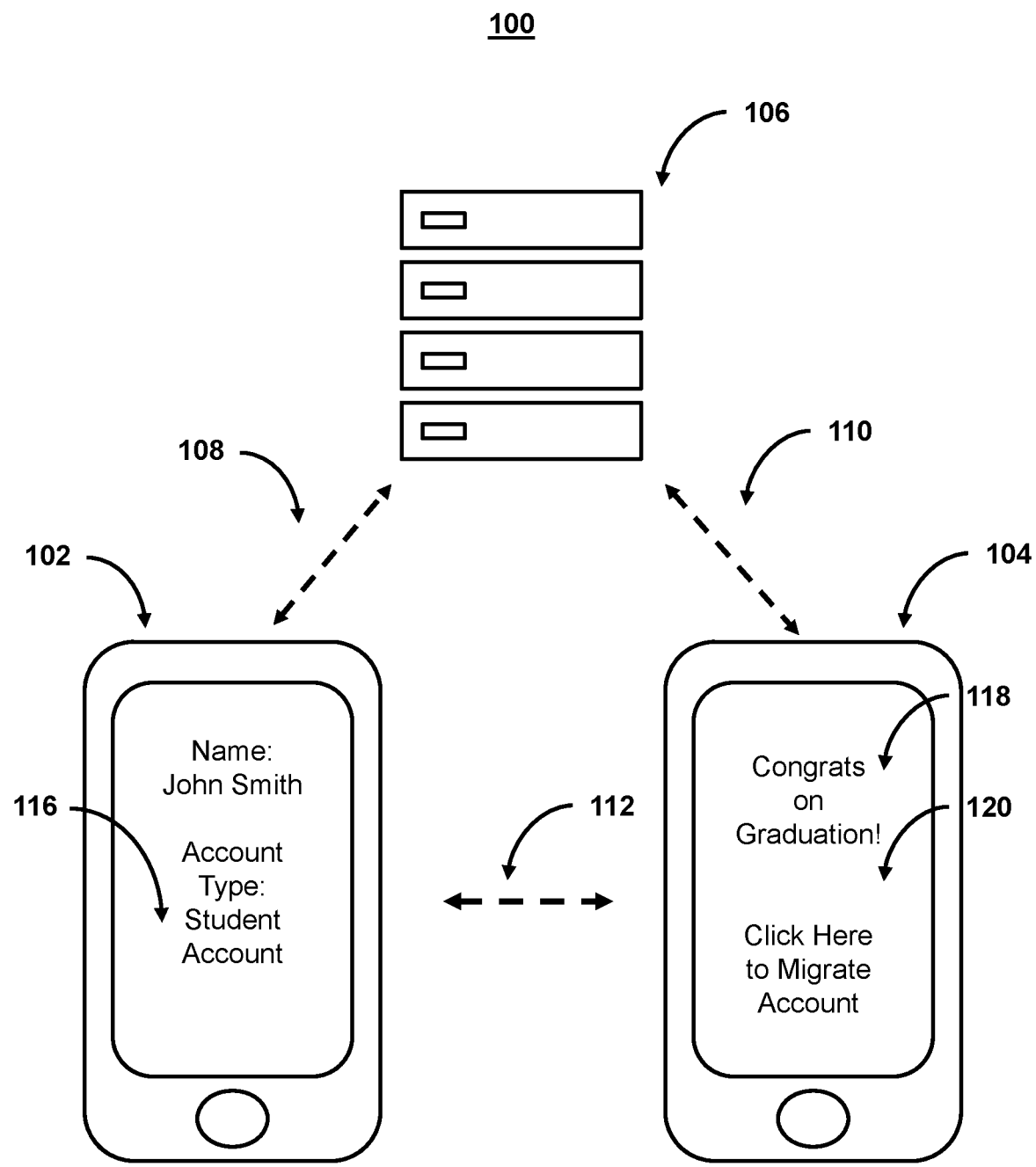
FIG. 1 shows an illustrative system for customizing recommendations based on user actions, in accordance with one or more example embodiments.

FIG. 1 shows an illustrative system for customizing recommendations based on user actions, in accordance with one or more embodiments. As shown in FIG. 1, system 100 may include user device 102 and user device 104 (e.g., mobile or other user devices). While shown as smartphones in FIG. 1, it should be noted that user device 102 and/or user device 104 may be any computing device, including, but not limited to, a personal computer (PC), a laptop computer, a tablet computer, a hand-held computer, other computer equipment (e.g., a server), including "smart," wireless, wearable, and/or mobile devices. FIG. 1 also includes server 106. Server 106 may alternatively be any computing device as described above and may include any type of mobile terminal, fixed terminal, or other device. It should also be noted that system 100 is not limited to three devices. Users may for instance, utilize one or more other devices to interact with one another, one or more servers, or other components of system 100. It should be noted that, while one or more operations are described herein as being performed by particular components of system 100, those operations may in some embodiments, be performed by other components of system 100. As an example, while one or more operations are described herein as being performed by components of user device 102, those operations may in some embodiments, be performed by components of server 106. In some embodiments, the various computers and systems described herein may include one or more computing devices that are programmed to perform the described functions.

With respect to the components of user device 102, user device 104, and server 106, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing circuitry. Each of these devices may also include a user input interface and/or display for use in receiving and displaying data. For example, as shown in FIG. 1, both user device 102 and user device 104 include a display upon which to display data. Additionally, as user device 102 and user device 104 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). As shown in FIG. 1, the user input interface of user device 102 and/or user device 104 may be configured to receive a first user input requesting to create an account for a user (e.g., "John Smith" as shown in FIG. 1) and receive a second user input selecting an account type (e.g., "Student Account") for the account from a plurality of account types. As shown in FIG. 1, in some embodiments the user input interface and the user output interface are integrated into a single user device (e.g., user device 102).

The devices in system 100 may run a user account application (or another suitable program). The application may cause the processors and/or control circuitry to perform operations related to the user account. For example, the processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 1 also includes communication paths 108, 110, and 112. Communication paths 108, 110, and 112 may include the Internet, a mobile phone network, a mobile voice or data network (e.g., a 4G or LTE network), a cable network, a public switched telephone network, or other types of communications network or combinations of communications networks. Communication paths 108, 110, and 112 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Paths 108, 110, and 112 are drawn with dotted lines to indicate that in the exemplary embodiment shown in FIG. 1, it is a wireless path. The computing devices may include additional communication paths linking a plurality of hardware, software, and/or firmware components operating together. For example, the computing devices may be implemented by a cloud of computing platforms operating together as the computing devices.

The control circuitry of user device 102 and/or 104 may be configured to retrieve one or more account requirements for the account type. That is, the system may determine the categories of data and/or the user data necessary for opening an account of the account type. As referred to herein "accounts" may include any type of computer account for a user. For example, the user account may be a location on a network server used to store a computer username, password, and other information. The user account may allow or not allow a user to connect to a network, another computer, or other shared resources. The embodiments herein are not limited to any particular type of account and may include, for example, bank accounts, subscription accounts, etc. The account may be for financial or non-financial purposes.

In some embodiments, a user account may be an aggregation of multiple user accounts established with multiple third-party entities. For example, a single user account may within it, include (or be linked and/or intertwined with) multiple other user accounts (e.g., a user's bank account, a user's utility account, a user's cable account, etc.). In such embodiments, the control circuitry may aggregate the account requirements for each of the multiple user accounts. Alternatively or additionally, the control circuitry may determine the common account requirements of the multiple user accounts. The common account requirements may then be used to determine the action types, as discussed below.

The control circuitry may determine that the user meets the one or more account requirements. For example, the control circuitry may receive a user input indicating that the user meets these requirements. Alternatively or additionally, the control circuitry may verify (e.g., based on known information about the user) that the user meet the account requirements either through self-verification or by transmitting user data to a third-party source for verification. For example, the control circuitry may query the user (e.g., via a user output interface on user device 102) for user data corresponding to the one or more account requirements and/or may query a third-party source for the user data. The control circuitry may receive the user data and compare the data to the account requirements. Upon determining that the user data meets the one or more account requirements, the control circuitry determines that the user meets the one or more account requirements. The control circuitry then creates the account in response to determining that the user meets the one or more account requirements.

After creating the user account, the control circuitry may begin the process of proactively generating recommendations for the user account and/or incentivizing user behavior. For example, after creating the user account, the control circuitry selects, based on the one or more account requirements, an action type from a plurality of action types for the account after creating the account, wherein actions completed by the user of the action type generate recommendations.

As referred to herein, an "action type" may be any category of action that may cause (upon completion or upon incompletion) a recommendation to be generated for display. An action type may be distinguished from another action type by any criteria. In some embodiments, an action type may be user-selected, suggested by the control circuitry, and/or based on information provided by a third-party or other device. For example, in some embodiments, an action type may be based on data from a global positioning system, a user profile, a wearable electronic device, and/or a user input. For example, an action type may be based on a user being in, not being in, and/or remaining in a particular geographic location (e.g., based on GPS data).

An action type may be based on a financial or non-financial metric. For example, an action type may include transaction actions, which are actions based on detectable electronic transactions (e.g., whether or not a user made a deposit in an account, made a credit card purchase/swipe, etc.). These transaction actions may be with either a provider of the user account or a third-party. An action type may be based on interactive/touchpoint actions, which are actions related to interactions with a person or service (e.g., whether or not a user logged-in to the account and/or another service, met a threshold level of engagement with a device, or telephoned a service center a threshold number of times). An action type may include contextual actions, which are actions based on data provided by a third-party (e.g., whether or not information about the user derived from an e-mail account, health insurance company, mortgage provide, and/or other third-party sources met a threshold level). The action type may also be based on the current lifecycle account (e.g., whether or not the account is a new or old account).

As shown in FIG. 1, the control circuitry has determined that action 118 has occurred (e.g., the user graduated). In response to detecting action 118 is completed (e.g., based on data received from a third-party source), the control circuitry generated for display, on a user output interface, recommendation 120 (e.g., migrate the student bank account to a regular back account). Upon selection of recommendation 120, the control circuitry may update the account based on the recommendation.

In some embodiments, the control circuitry may further select a recommendation type for the user account. As referred to herein, a "recommendation type" may be any category of recommendation. Recommendation types may be categorized by any criteria that distinguishes one category from another. In some embodiments, a recommendation type may be based on how a recommendation is displayed, when a recommendation is displayed, and/or on what device the recommendation is displayed. The recommendation type may also be based on whether the recommendation is for a financial or non-financial matter. The recommendation type may also be based on the entity providing the recommendation (e.g., whether or not the recommendation is from the provider of the user account or a third-party provider).

For example, in some embodiments, the recommendations may be categorized as rewards, penalties and/or incentives. For example, a reward recommendation may be provided for completing an action, a penalty recommendation may be provided for not completing an action, and incentive recommendations may be provided while a user is progressing towards the completion of an action. In some embodiments, incentive recommendations are based on the type of user as opposed to the account itself (or the amount in the account or type of account). The incentive may be a financial incentive for the user account (e.g., an adjustment to an interest rate, cash matching, etc.). The incentives may be to other users (e.g., a parent of a student account holder, a joint account holder, a co-signee of an account, etc.). The incentives may be provided by other entities (e.g., a coupon provided by a local business). The incentives may be a good or service such as money coaching, credit score services, etc.

In some embodiments, the control circuitry may select the recommendation type from a plurality of recommendation types based on a user type. For example, the control circuitry may query the user for user data corresponding to the one or more account requirements (e.g., the name, address, social security number, income level, etc.). The control circuitry may then receive the user data and determine a user type of the user based on the user data. For example, based on the user data, the control circuitry may categorize the user. Once the user is categorized, the control circuitry may input the user type into a database that lists a preferred recommendation type for the inputted user type.

In some embodiments, the control circuitry may select a recommendation for the account from a plurality of recommendations of a recommendation type. For example, upon selecting a recommendation type for the user account, the control circuitry may then select a recommendation from the plurality of recommendations of that type. Each recommendation may feature a different value and/or degree of an incentive, reward, and/or penalty.

As shown in FIG. 1, a recommendation has been generated on user device 104. In some embodiments, user device 104 may represent a user device operated by another user and currently accessing a user account of the other user. For example, in some embodiments, recommendations may appear for user account other than the user account for which the action was completed.

For example, the system may determine that at least one of the one or more account requirements is a requirement for a second user to be associated with the account. The system may then determine a second account associated with the second user (e.g., based on metadata). The system may then generate for display, on a second user interface for a second user device (e.g., user device 104), a recommendation for the second account based on completion of an action of the action type. For example, if a parent of a student is associated with a student account, the system may provide recommendations to the parent based on the completed actions of the student. The parent's account is then updated based on the recommendation.

In another example, the system may generate recommendations for a first user account on a user device associated with a second user account. For example, the system may determine that at least one of the one or more account requirements is a requirement for a second user to be associated with the account. In response, the system may generate for display, on a second user interface for a second user device, a recommendation for the account based on completion of the action of the action type. The system may then wait to receive an acceptance of the recommendation (e.g., by a second user) to update the account based on the recommendation. For example, if a parent of a student is associated with a student account, the system may provide recommendations to the parent based on the completed actions of the student. The student's account is then updated based on the recommendation.

Figure 2:
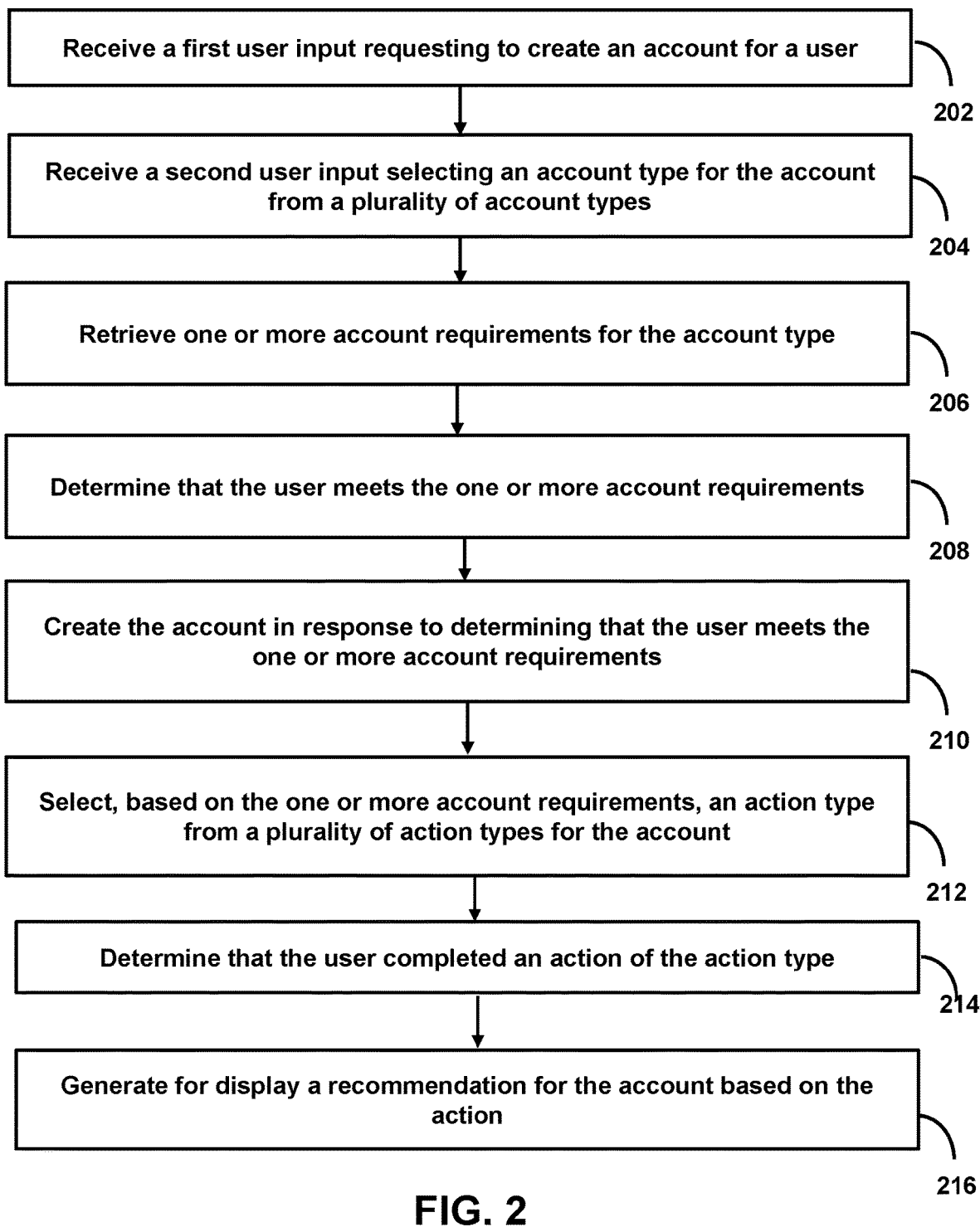
FIG. 2 shows a flowchart of the steps involved in generating a recommendation, in accordance with one or more example embodiments.

FIG. 2 shows a flowchart of the steps involved in generating a recommendation on one of devices 102, 104, or 106 (FIG. 1). Process 200 begins at step 202. At step 202, the system receives (e.g., via user device 102 (FIG. 1)), a first user input requesting to create an account for a user. For example, the user may enter into a user input interface on a user device a request to create an account.

At step 204, the system receives (e.g., via user device 102 (FIG. 1)), a second user input selecting an account type for the account from a plurality of account types. For example, the user may enter into a user input interface on a user device a selection of a type of account that the user would like to create. In some embodiments, the user may select from one or more account types that are available for creation. For example, the system may generate a drop down of available account types for the user to create.

At step 206, the system retrieves (e.g., from server 106 (FIG. 1)), one or more account requirements for the account type. For example, each account type may include one or more account requirements. The one or more account requirements may be stored in a database on a remote server. The system may transmit (e.g., from user device 102 (FIG. 1)) a request for account requirements. In response to receiving the request, server 106 (FIG. 1)) may input the account type into a database listing the requirements for the account type. Server 106 (FIG. 1) may then output the account requirements to user device 102 (FIG. 1).

At step 208, the system determines that the user meets the one or more account requirements. For example, the system may query the user for user data corresponding to the one or more account requirements and receive the user data in response. For example, the system may query the user via a user input interface and/or may pull user data from user device 102 (FIG. 1) automatically and/or from server 106 (FIG. 1). In some embodiments, the system may pull user data from a preexisting user account.

At step 210, the system creates the account in response to determining that the user meets the one or more account requirements. For example, the system may verify that the received user data meets the account requirements and/or that all fields corresponding to account requirements have been populated.

At step 212, the system selects, based on the one or more account requirements, an action type from a plurality of action types for the account. For example, as further discussed in FIG. 5 below, the system may use the account requirements and/or characteristics about the account requirements to select an action type for the user account.

At step 214, the system determines that the user completed an action of the action type. For example, the system may receive a user input indicating that the action has been completed. Alternatively or additionally, the system may receive a verification from another device. In some embodiments, the acceptable verification may be determined based on metadata corresponding to the action type of the action.

At step 216, the system generating for display (e.g., on a user interface of user device 102 (FIG. 1), a recommendation for the account based on completion of the action of the action type. For example, in response to determining that the action has been completed, the system may generate a recommendation of a given recommendation type (e.g., as further discussed in FIG. 4 below).

It is contemplated that the steps or descriptions of FIG. 2 may be used with any other embodiment of this disclosure. In addition, the steps and descriptions described in relation to FIG. 2 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one or more of the steps in FIG. 2.

Figure 3:
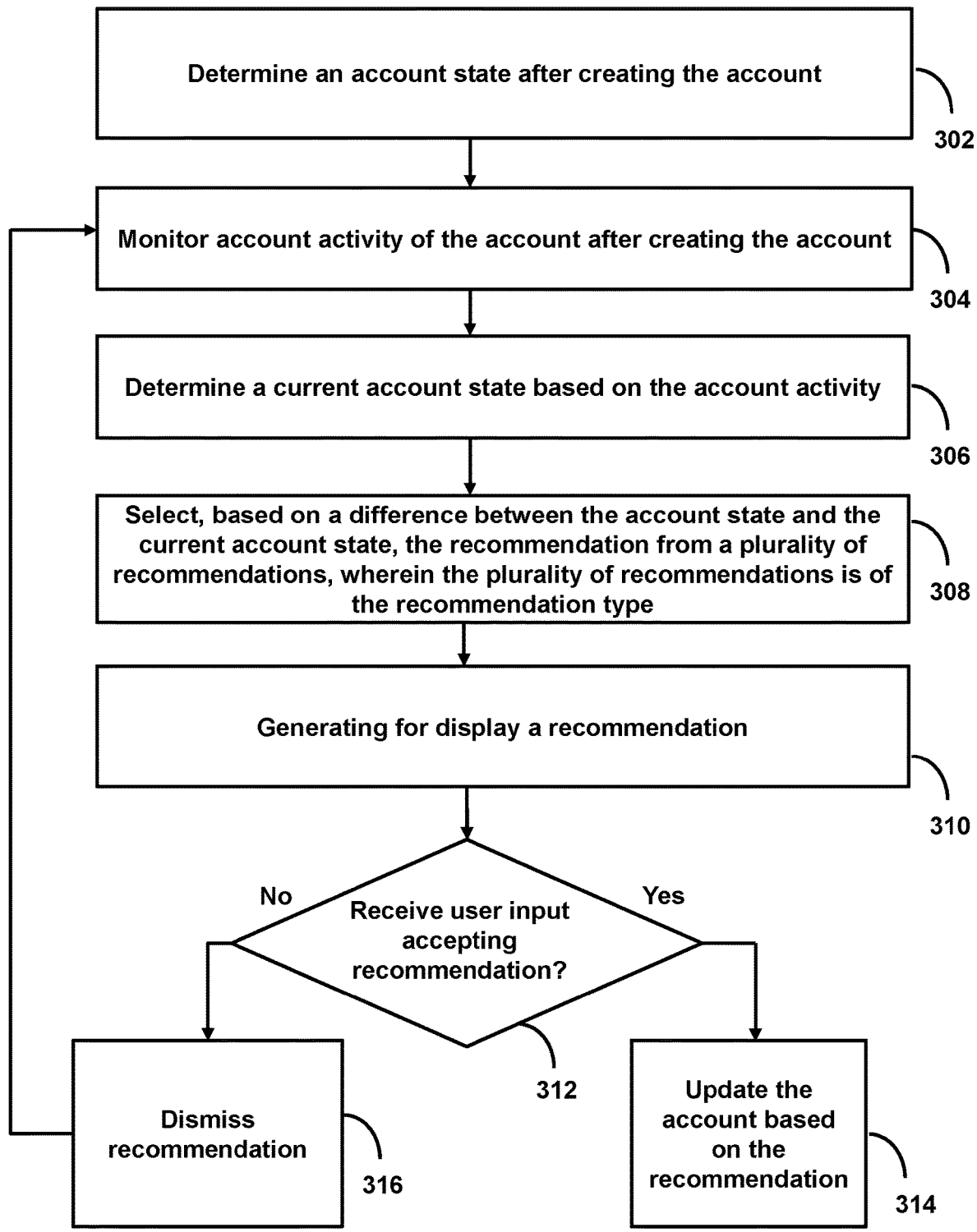
FIG. 3 shows a flowchart of the steps involved in updating an account, in accordance with one or more example embodiments.

FIG. 3 shows a flowchart of the steps involved in updating an account. For example, FIG. 3 may correspond to a process performed by the system following the generation of a recommendation in step 216 of FIG. 2 on one of devices 102, 104, or 106 (FIG. 1). For example, in some embodiments, the recommendation that is selected by the system may be based on a difference between a first count state and a current account state. For example, in order to provide a dynamic, proactive approach, the control circuitry may continually monitor the state of the account.

At step 302, the system may determine an account state after creating the account. For example, as part of the monitoring process, the system may determine a first account state after creating the account. The account state may be measured by financial or non-financial metrics. For example, if the account state is measured by financial metrics, the first account state may be measured by the size and/or value of the account. Alternatively or additionally, if the account state is measured by non-financial metrics (e.g., an emotional state), the first account state may be measured by the level of happiness of the user.

At step 304, the system monitors account activity of the account after creating the account. For example, in a financial embodiment, the account state may be monitored to determining if the value of the account has grown. Additionally or alternatively, the system may monitor an emotional state of the user. For example, the system may query the user as to his/her level of happiness, sense of security, etc. The system may monitor the state of the account on a predetermined schedule, a periodic schedule, or in response to determining that a user completed an action of the action type for the account.

At step 306, the system determines a current account state based on the account activity. For example, while monitoring the state of the account, the system may determine a current account state based on the account activity for the current time period. The system may then store information on the current state of the account to compare it to the first account state.

At step 308, the system selects, based on a difference between the account state and the current account state, the recommendation from a plurality of recommendations, wherein the plurality of recommendations is of the recommendation type. In some embodiments, the calculation of difference in the account state may include determining a first timepoint and second timepoint and comparing the state of the account at the timepoints. These timepoints may also be used to determine a rate of change in the account as well as tracking goals of the user. For example, user may state that he or she is currently (i.e., at the first timepoint) happy after opening an account (e.g., a first account state). The goal of the user is to be more secure (e.g., a second account state) in the future (second time point). The user may also select actions such as going to the gym and buying a new car. Upon completion of the action, the system may poll the user for happiness and security (e.g., for a current account state at a current timepoint). The system may determine a rate of change and provide a recommendation on whether the future actions should be changed, the length of time between actions should be adjusted, etc.

At step 310, the system generates a recommendation (e.g., recommendation 120 (FIG. 1)). For example, the system may generate a recommendation receiving a confirmation from a second device that the user completed the action. Alternatively or additionally, the system may generate a recommendation in response to receiving a confirmation from a third party that the user completed the action. Alternatively or additionally, the system may generate a recommendation in response to determining that the difference between the account state and the current account state has changed and/or equals or exceeds, or has fallen below, a predetermined threshold.

At step 312, the system determines whether or not it has received a user input accepting the recommendation. If so, the system proceeds to step 314 and updates the account based on the recommendation. If not, the system proceeds to step 316 and dismisses the recommendation before returning to step 304. In some embodiments, the system may further record that the recommendation was not accepted to prevent the recommendation from being presented again. For example, depending on the recommendation and/or the cause of the recommendation, the system may modify the account to reflect either the acceptance or dismissal of the recommendation.

It is contemplated that the steps or descriptions of FIG. 3 may be used with any other embodiment of this disclosure. In addition, the steps and descriptions described in relation to FIG. 3 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one or more of the steps in FIG. 3.

Figure 4:
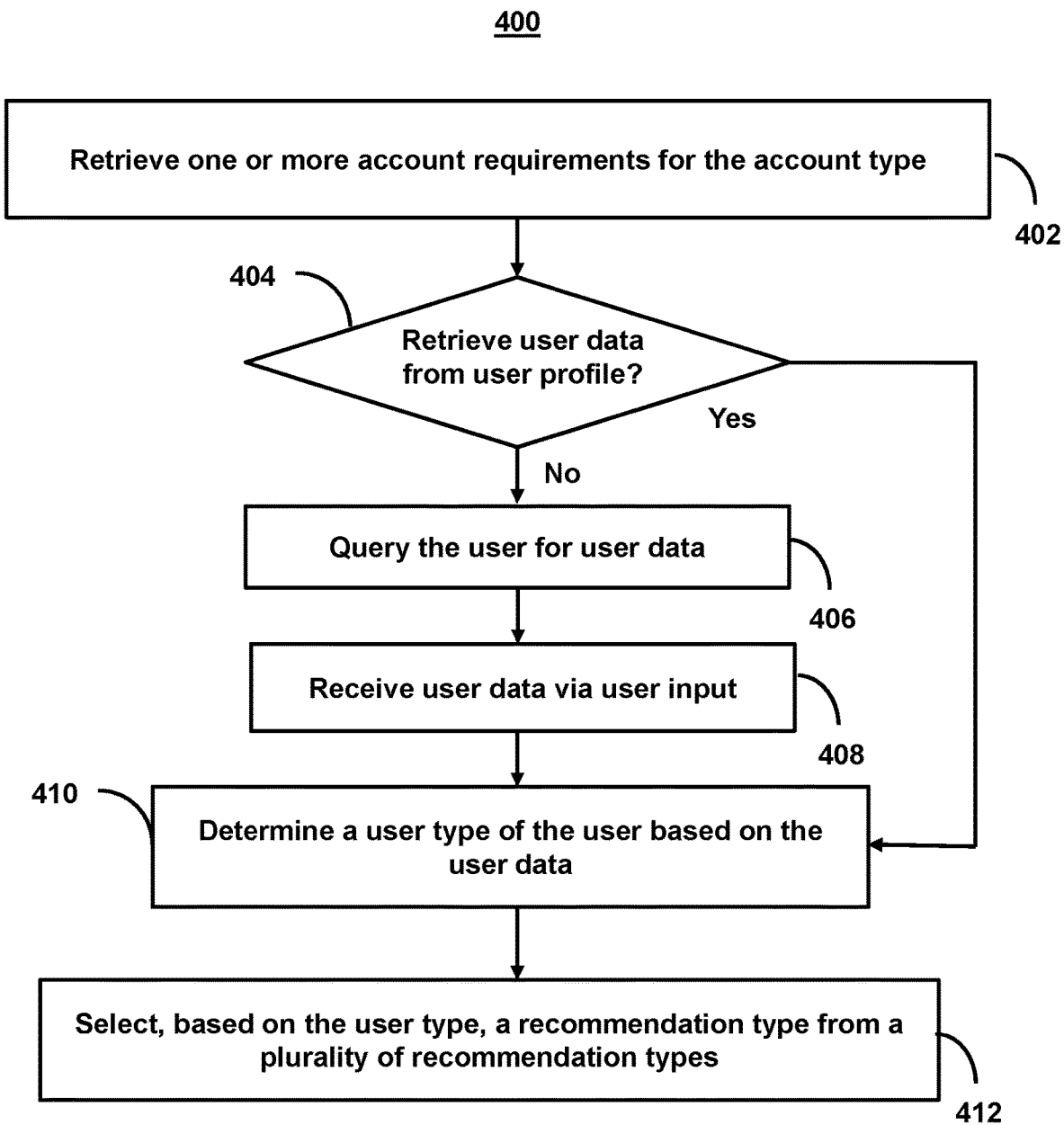
FIG. 4 shows a flowchart of the steps involved in selecting a recommendation type, in accordance with one or more example embodiments.

FIG. 4 shows a flowchart of the steps involved in selecting a recommendation type. For example, FIG. 4 may correspond to a process performed by the system in order to generate a recommendation in step 216 of FIG. 2 on one of devices 102, 104, or 106 (FIG. 1).

At step 402, the system retrieves (e.g., from server 106 (FIG. 1)), one or more account requirements for the account type. For example, each account type may include one or more account requirements. The one or more account requirements may be stored in a database on a remote server. The system may transmit (e.g., from user device 102 (FIG. 1)) a request for account requirements. In response to receiving the request, server 106 (FIG. 1)) may input the account type into a database listing the requirements for the account type. Server 106 (FIG. 1) may then output the account requirements to user device 102 (FIG. 1).

At step 404, the system determines whether to retrieve the user data from a user profile. For example, the system may query the user via a user input interface and/or may pull user data from user device 102 (FIG. 1) automatically and/or from server 106 (FIG. 1). In some embodiments, the system may pull user data from a preexisting user account. If the system determines to retrieve the user data from a preexisting user profile and/or account, the system proceeds to step 410. If not, the system proceeds to step 406.

At step 406, the system queries the user for user data. For example, the system may query the user for user data corresponding to one or more account requirements and receive the user data in response. For example, the system may query the user via a user input interface (e.g., as shown in FIG. 1).

At step 408, the system receives user data via user input. For example, the system may receive the user data via the user entering the user data into one or more fields of an online form for the account.

At step 410, the system determines a user type of the user based on the user data. For example, the system may categorize users into categories based on their user data. For example, users with similar characteristics may be designated as sharing the same category. Once the user is categorized, the system may input the user type into a database that lists a preferred recommendation type for the inputted user type. At step 412, the system selects, based on the user type, a recommendation type from a plurality of recommendation types.

It is contemplated that the steps or descriptions of FIG. 4 may be used with any other embodiment of this disclosure. In addition, the steps and descriptions described in relation to FIG. 4 may be done in alternative or in parallel orders to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIG. 1 could be used to perform one or more of the steps in FIG. 4.

Figure 5:
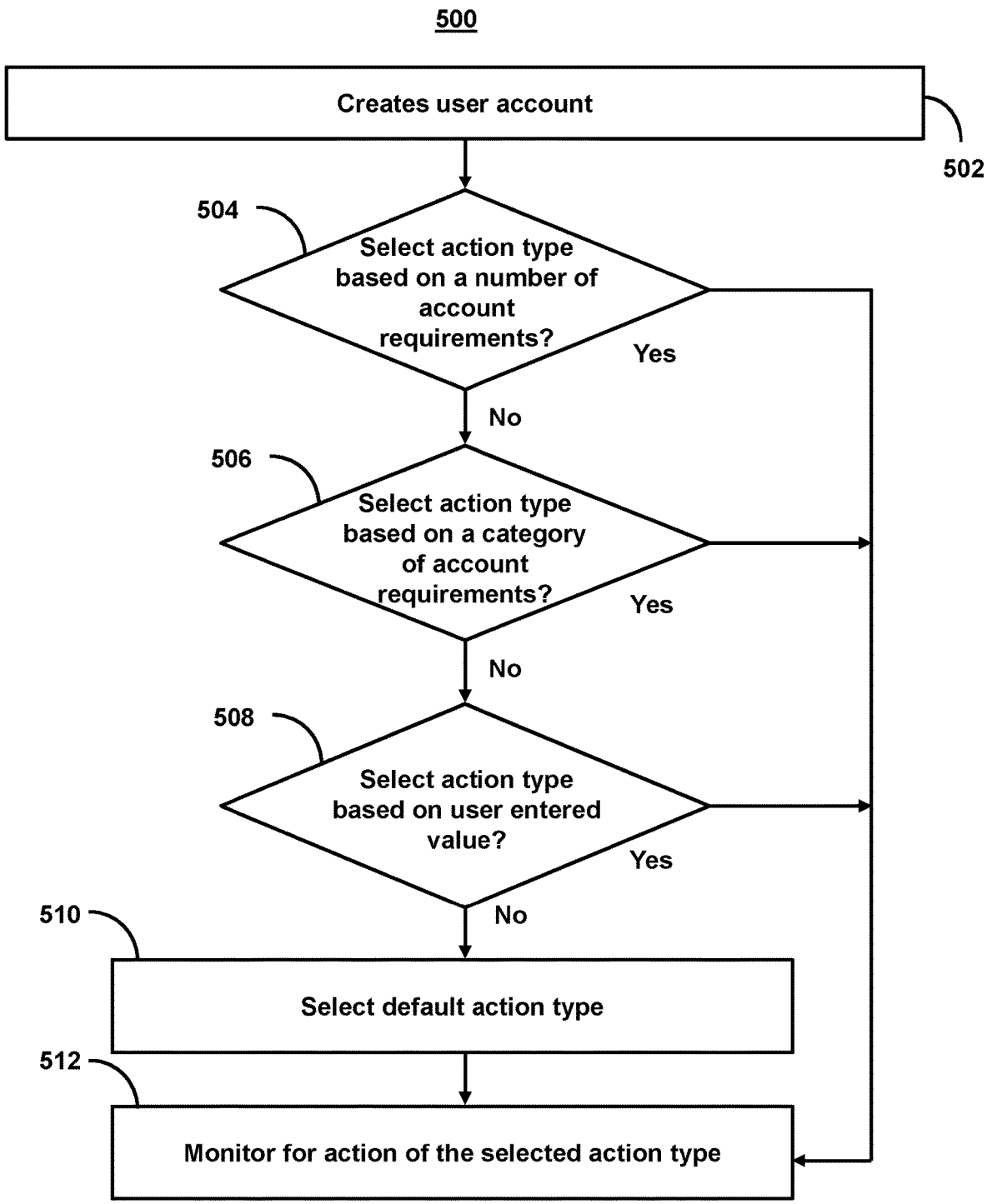
FIG. 5 shows a flowchart of the steps involved in selecting an action type, in accordance with one or more example embodiments.

FIG. 5 shows a flowchart of the steps involved in selecting an action type. For example, FIG. 5 may correspond to process 500 as performed by the system, as described in step 212 of FIG. 2 on one of devices 102, 104, or 106 (FIG. 1).

At step 502, the system creates a user account. For example, as described in step 210 (FIG. 2) above, the system may create an account in response to determining that the user meets the one or more account requirements. For example, the system may verify that the received user data meets the account requirements and/or that all fields corresponding to the account requirements have been populated. The system may then select an action type for the account based on one or more account requirements. As stated above, by using the account requirements as the basis of the action type selection (as opposed to simply using an account type itself), the system can select a starting point for the tailoring of the account that is both more flexible and applicable to a wider spectrum of accounts (e.g., user accounts that include aggregations of other accounts). For example, in some embodiments user accounts may be linked and/or intertwined with each other. Moreover, these different user accounts may be associated with different entities (and have different naming conventions despite being similar account types) and/or feature different APIs. Therefore, merging these accounts may not be feasible. By relying on the underlying account requirements for these accounts, as opposed to a particular type of account, the system can select actions based on the account requirements. Thus, despite the user account being composed of multiple other accounts, the incentivization of the action type selection is still accomplished.

At step 504, the system determines whether or not to select an action type based on a number of account requirements. For example, in some embodiments, accounts from different entities may have different naming conventions or incompatible APIs. In such cases, the number of account requirements may indicate the type of account. For example, a first account type may have five account requirements, whereas a second account type may have six account requirements. Based on determining the number of account requirements, the system may identify a type of account. Additionally, the system may determine that because an account has numerous requirements (that must have been met by the user), the account is more exclusive and therefore the action types should reflect this. If the system determines to select an action type based on a number of account requirements, the system determines a number of the one or more account requirements and selects the action type from the plurality of action types for the account based on the number of the one or more account requirements before proceeding to step 512. If not, the system proceeds to step 506.

At step 506, the system determines whether or not to select an action type based on a category of account requirements. For example, the system may categorize the account requirements and/or the user data needed to meet the account requirements. For example, if the account requirements include personally identifiable information and/or any confidential information, the system may categorize the account requirement as such. The action types selected may then only be those that preserve the confidentiality of the information. In another example, if the account requirements include information about an underage user, the system may categorize the account requirement as such. The action types selected may then be appropriate for an underage user and/or require parental consent. If the system determines to select an action type based on a category of account requirements, the system determines a category corresponding to a requirement of the one or more account requirements and selects the action type from the plurality of action types for the account based on the category before proceeding to step 512. If not, the system proceeds to step 508.

At step 508, the system determines whether or not to select an action type based on a user entered value. For example, in addition or alternatively to analyzing the account requirements, the system may also analyze the information entered by a user. For example, if the information entered by the user (e.g., a name) is a common name, the system may only select action types that will not result in mass distribution that could potentially result in user confusion. In another example, if the user entered data which indicates that the user is of a particular demographic, the system may select action types based on that demographic before proceeding to step 512. If not, the system proceeds to step 510.

At step 510, the system selects a default action type. For example, if the system determines (e.g., based on a user's input, lack of user data, or unidentifiable account requirement information) that other criteria for selecting the action type is unavailable, the system selects a default action type before proceeding to step 512.

At step 512, the system monitors for an action of the selected action type. In some embodiments, monitoring for an action may include receiving data from another device. For example, an action type based on a location of a user may require data from a global positioning system. An action type based on a biometric (e.g., emotion, health status, etc.) of a user may require data from a wearable electronic device and/or health provider. An action type based on the financial health of a user may require data from numerous financial institutions.

It is contemplated that the steps or descriptions of FIG. 5 may be used with any other embodiment of this disclosure. In addition, the steps and descriptions described in relation to FIG. 5 may be done in alternative or in parallel orders to further the purposes of this disclosure. For example, each of these steps may be performed in any order, or in parallel to, or substantially simultaneously to reduce lag or increase the speed of the system or method. For example, in some embodiments, an action type may be selected based on multiple criteria (e.g., both a number of the account requirements and the category of account requirements). Furthermore, it should be noted that any of the devices or equipment discussed in relation to FIG. 1 could be used to perform one or more of the steps in FIG. 5.

The above-described embodiments are presented for purposes of illustration and not limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

Additional examples are provided with reference to the following enumerated embodiments:

1. A method for customizing user accounts based on user actions, the method comprising: receiving, via a user device, a first user input requesting to create an account for a user; receiving, via the user device, a second user input selecting an account type for the account from a plurality of account types; retrieving, from a server, one or more account requirements for the account type; determining that the user meets the one or more account requirements; in response to determining that the user meets the one or more account requirements, creating the account; selecting, based on the one or more account requirements, an action type from a plurality of action types for the account; determining that the user completed an action of the action type; and generating for display, on a user interface for the user device, a recommendation for the account based on completion of the action of the action type.
2. The method of embodiment 1, further comprising: receiving a third user input accepting the recommendation; and updating the account based on the recommendation.
3. The method of any one of embodiments 1-2, further comprising: querying the user for user data corresponding to the one or more account requirements; and receiving the user data, wherein determining that the user meets the one or more account requirements comprises determining that the user data meets the one or more account requirements; determining a user type of the user based on the user data; and selecting, based on the user type, a recommendation type from a plurality of recommendation types, wherein the recommendation is of the recommendation type.
4. The method of any one of embodiments 1-3, further comprising: determining a first account state after creating the account; monitoring account activity of the account; determining a current account state based on the account activity; selecting, based on a difference between the first account state and the current account state, the recommendation from a plurality of recommendations of a recommendation type.
5. The method of any one of embodiments 1-4, wherein selecting the action type from the plurality of action types for the account based on the one or more account requirements comprises: determining a number of the one or more account requirements; and selecting the action type from the plurality of action types for the account based on the number of the one or more account requirements.
6. The method of any one of embodiments 1-5, wherein selecting the action type from the plurality of action types for the account based on the one or more account requirements comprises: determining a category corresponding to a requirement of the one or more account requirements; and selecting the action type from the plurality of action types for the account based on the category.
7. The method of any one of embodiments 1-6, wherein selecting the action type from the plurality of action types for the account based on the one or more account requirements comprises: determining a value entered by the user corresponding to a requirement of the one or more account requirements; and selecting the action type from the plurality of action types for the account based on the value.
8. The method of any one of embodiments 1-7, wherein determining that the user completed the action comprises receiving a confirmation from a second device that the user completed the action.
9. The method of any one of embodiments 1-8, wherein determining that the user completed the action comprises receiving a confirmation from a third party that the user completed the action.
10. The method of any one of embodiments 1-9, further comprising: determining that at least one of the one or more account requirements is a requirement for a second user to be associated with the account; determining a second account associated with the second user; and generating for display, on a second user interface for a second user device, a recommendation for the second account based on completion of the action of the action type.
11. The method of any one of embodiments 1-10, further comprising: determining that at least one of the one or more account requirements is a requirement for a second user to be associated with the account; generating for display, on a second user interface for a second user device, a recommendation for the account based on completion of the action of the action type; receiving an acceptance of the recommendation; and updating the account based on the recommendation.
12. The method of any one of embodiments 1-11, wherein receiving the first user data comprises: retrieving a first portion of the first user data from the user profile for the first user; and receiving a second portion of the first user data through user inputs entered at the first user device.

What is claimed is:
1. A system for customizing user records that aggregate data from multiple other records featuring different application programming interfaces ("APIs") based on user actions and underlying record requirements, comprising:
a user input interface configured to:
receive a first user input requesting to create a record for a user, wherein the record aggregates data from multiple user records established with respective third-party entities, and wherein the multiple user records feature a plurality of different APIs; and
receive a second user input selecting a record type for the record from a plurality of record types; and
control circuitry configured to:
receive user data for the user, wherein determining that the user meets one or more record requirements comprises determining that the user data meets the one or more record requirements;
determine a user type of the user based on the user data;
select, based on the user type, a recommendation type from a plurality of recommendation types;
determine that the user meets the one or more record requirements;
create the record in response to determining that the user meets the one or more record requirements as required by the record type;
select, based on the one or more record requirements, an action type from a plurality of action types for the record after creating the record, wherein actions completed by the user of the action type generate recommendations, and wherein the plurality of action types correspond to different types of detectable electronic transactions;
determine a first record state after creating the record, wherein the first record state is measured by a metric;

monitor record activity of the record, wherein the record activity comprises an exchange of electronic communications with the respective third-party entities;
determine that the user completed an action of the action type;
determine a current record state based on the record activity, wherein the current record state is measured by the metric;
select, based on a change between the first record state and the current record state, a recommendation for the record from a plurality of recommendations of the recommendation type, wherein the recommendation type is selected from the plurality of recommendation types that include a reward recommendation type, a penalty recommendation type, and an incentive recommendation type;
generate for display, on a user output interface, the recommendation for the record based on completion of the action of the action type; and
update the record to indicate acceptance of the recommendation in response to a third user input accepting the recommendation.

2. A method for customizing user records that aggregate data from multiple other records featuring different application programming interfaces ("APIs") based on user actions and underlying record requirements, the method comprising:
receiving, via a user device, a first user input requesting to create a record for a user, wherein the record aggregates data from multiple user records established with respective third-party entities, and wherein the multiple user records feature a plurality of different APIs;
receiving, via the user device, a second user input selecting a record type for the record from a plurality of record types;
retrieving, from a server, one or more record requirements for the record type;
selecting, based on the one or more record requirements, an action type from a plurality of action types for the record;
determining that the user completed an action of the action type;
determining a first record state after creating the record, wherein the first record state is measured by a metric;
monitoring record activity of the record, wherein the record activity comprises an exchange of electronic communications with the respective third-party entities;
determining a current record state based on the record activity, wherein the current record state is measured by the metric;
selecting, based on a rate of change between the first record state and the current record state, a recommendation from a plurality of recommendations of a recommendation type;
generating for display, on a user interface for the user device, the recommendation for the record based on completion of the action of the action type; and
updating the record to indicate acceptance of the recommendation in response to a third user input accepting the recommendation.

3. The method of claim 2, further comprising:
receiving a third user input accepting the recommendation; and
updating the record to indicate acceptance of the recommendation in response to the third user input.

4. The method of claim 2, further comprising:
querying the user for user data corresponding to the one or more record requirements;
receiving the user data, wherein determining that the user meets the one or more record requirements comprises determining that the user data meets the one or more record requirements;
determining a user type of the user based on the user data; and
selecting, based on the user type, the recommendation type from a plurality of recommendation types, wherein the recommendation is of the recommendation type, wherein the recommendation type is selected from the plurality of recommendation types that include a reward recommendation type, a penalty recommendation type, and an incentive recommendation type.

5. The method of claim 2, wherein selecting the action type from the plurality of action types for the record based on the one or more record requirements comprises:
determining a number of the one or more record requirements; and
selecting the action type from the plurality of action types for the record based on the number of the one or more record requirements.

6. The method of claim 2, wherein selecting the action type from the plurality of action types for the record based on the one or more record requirements comprises:
determining a category corresponding to a requirement of the one or more record requirements; and
selecting the action type from the plurality of action types for the record based on the category.

7. The method of claim 2, wherein selecting the action type from the plurality of action types for the record based on the one or more record requirements comprises:
determining a value entered by the user corresponding to a requirement of the one or more record requirements; and
selecting the action type from the plurality of action types for the record based on the value.

8. The method of claim 2, wherein determining that the user completed the action comprises receiving a confirmation from a second device that the user completed the action.

9. The method of claim 2, wherein determining that the user completed the action comprises receiving a confirmation from a third party that the user completed the action.

10. The method of claim 2, further comprising:
determining that at least one of the one or more record requirements is a requirement for a second user to be associated with the record;
determining a second record associated with the second user; and
generating for display, on a second user interface for a second user device, a recommendation for the second record based on completion of the action of the action type.

11. The method of claim 2, further comprising:
determining that at least one of the one or more record requirements is a requirement for a second user to be associated with the record;
generating for display, on a second user interface for a second user device, a second recommendation for the record based on completion of the action of the action type;

receiving an acceptance of the second recommendation; and updating the record to indicate acceptance of the second recommendation in response to receiving the acceptance of the second recommendation.

12. The method of claim 2, further comprising:

determining that the user meets the one or more record requirements as required by the record type; and in response to determining that the user meets the one or more record requirements, creating the record.

13. The method of claim 2, wherein the recommendation type is selected from a plurality of recommendation types that include a reward recommendation type and a penalty recommendation type.

14. The method of claim 2, wherein the record corresponds to an account of the user.

15. A non-transitory computer-readable media for customizing user records that aggregate data from multiple other records featuring different application programming interfaces ("APIs") based on user actions and underlying record requirements comprising instructions that, when executed by one or more processors, cause operations comprising:

receiving a first user input requesting to create a record for a user, wherein the record aggregates data from multiple user records established with respective third-party entities, and wherein the multiple user records feature a plurality of different APIs;

receiving a second user input selecting a record type for the record from a plurality of record types;

retrieving one or more record requirements for the record type;

determining that the user meets the one or more record requirements as required by the record type;

in response to determining that the user meets the one or more record requirements, creating the record;

selecting, based on the one or more record requirements, an action type from a plurality of action types for the record;

determining that the user completed an action of the action type;

determining a first record state after creating the record, wherein the first record state is measured by a metric;

monitoring record activity of the record;

determining a current record state based on the record activity, wherein the current record state is measured by the metric;

selecting, based on a change between the first record state and the current record state, a recommendation from a plurality of recommendations of a recommendation type, wherein the recommendation type is selected from a plurality of recommendation types that include a reward recommendation type, a penalty recommendation type, and an incentive recommendation type;

generating for display the recommendation for the record based on completion of the action of the action type; and updating the record to indicate acceptance of the recommendation in response to a third user input accepting the recommendation.

16. The non-transitory computer-readable media of claim 15, the operations further comprising:

receiving a third user input accepting the recommendation; and updating the record to indicate acceptance of the recommendation in response to the third user input.

17. The non-transitory computer-readable media of claim 15, the operations further comprising:

querying the user for user data corresponding to the one or more record requirements; and receiving the user data, wherein determining that the user meets the one or more record requirements comprises determining that the user data meets the one or more record requirements;

determining a user type of the user based on the user data; and selecting, based on the user type, the recommendation type from the plurality of recommendation types, wherein the recommendation is of the recommendation type.

18. The non-transitory computer-readable media of claim 15, wherein selecting the action type from the plurality of action types for the record based on the one or more record requirements comprises:

determining a number of the one or more record requirements; and selecting the action type from the plurality of action types for the record based on the number of the one or more record requirements.

19. The non-transitory computer-readable media of claim 15, wherein selecting the action type from the plurality of action types for the record based on the one or more record requirements comprises:

determining a category corresponding to a requirement of the one or more record requirements; and selecting the action type from the plurality of action types for the record based on the category.

20. The non-transitory computer-readable media of claim 15, wherein selecting the action type from the plurality of action types for the record based on the one or more record requirements comprises:

determining a value entered by the user corresponding to a requirement of the one or more record requirements; and selecting the action type from the plurality of action types for the record based on the value.

* * * * *